United States Patent
Que et al.

(10) Patent No.: US 9,885,896 B2
(45) Date of Patent: Feb. 6, 2018

(54) FRONT FRAME OF THE CURVED LIQUID CRYSTAL DISPLAY DEVICE AND THE CURVED LIQUID CRYSTAL DISPLAY DEVICE

(71) Applicant: Shenzhen China Star Optoelectronics Technology Co., Ltd., Shenzhen, Guangdong (CN)

(72) Inventors: Chengwen Que, Guangdong (CN); Yuchun Hsiao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 91 days.

(21) Appl. No.: 14/889,245

(22) PCT Filed: Mar. 3, 2015

(86) PCT No.: PCT/CN2015/073587
§ 371 (c)(1),
(2) Date: Nov. 5, 2015

(87) PCT Pub. No.: WO2016/131199
PCT Pub. Date: Aug. 25, 2016

(65) Prior Publication Data
US 2016/0370639 A1 Dec. 22, 2016

(30) Foreign Application Priority Data

Feb. 16, 2015 (CN) .......................... 2015 1 0084458

(51) Int. Cl.
*G02F 1/1333* (2006.01)
*F21V 8/00* (2006.01)

(52) U.S. Cl.
CPC ..... *G02F 1/133308* (2013.01); *G02B 6/0055* (2013.01); *G02B 6/0085* (2013.01);
(Continued)

(58) Field of Classification Search
CPC ..... G02F 2001/13332; G02F 1/133308; G02F 1/133305
See application file for complete search history.

(56) References Cited

U.S. PATENT DOCUMENTS

2008/0252811 A1* 10/2008 Shang .................. G02B 6/0088
349/60
2010/0073593 A1* 3/2010 Sasaki .................. B29D 11/00
349/58

(Continued)

FOREIGN PATENT DOCUMENTS

| CN | 103824518 A | * | 5/2014 |
| CN | 103838036 A | | 6/2014 |
| CN | 103901655 A | | 7/2014 |

*Primary Examiner* — Jia Pan
(74) *Attorney, Agent, or Firm* — Andrew C. Cheng

(57) ABSTRACT

A front frame of a curved liquid crystal display device is disclosed in the present invention. The liquid crystal display device includes a curved liquid crystal panel and a backlight module. The front frame is used for connecting the curved liquid crystal panel and the backlight module. The front frame includes a side board and a front board, wherein the side board is vertically shaped and is connected to the backlight module. The front board includes a flat part and a curved part, the flat part is perpendicularly connected to the side board at one end and is connected to the curved part at another end. The curved part is pressed on and is fixed to the curved liquid crystal panel. A curved liquid crystal display device including the above front frame is also disclosed in the present invention.

7 Claims, 3 Drawing Sheets

(52) U.S. Cl.
CPC ......... *G02F 1/133305* (2013.01); *G02F 2001/13332* (2013.01); *G02F 2001/133317* (2013.01); *G02F 2001/133325* (2013.01); *G02F 2201/56* (2013.01)

(56) References Cited

U.S. PATENT DOCUMENTS

| | | | |
|---|---|---|---|
| 2013/0321740 A1* | 12/2013 | An | H05K 5/0217 |
| | | | 349/58 |
| 2014/0022485 A1* | 1/2014 | Kuo | G02F 1/133308 |
| | | | 349/58 |
| 2014/0036195 A1* | 2/2014 | Kuo | G02F 1/133308 |
| | | | 349/58 |
| 2014/0125913 A1* | 5/2014 | Lee | G02B 6/0093 |
| | | | 349/58 |
| 2014/0240644 A1* | 8/2014 | Abe | G02B 6/0088 |
| | | | 349/71 |
| 2016/0095205 A1* | 3/2016 | Cho | G02F 1/133308 |
| | | | 361/749 |
| 2017/0010501 A1* | 1/2017 | Kamiyama | G02F 1/133308 |

\* cited by examiner

FRONT FRAME OF THE CURVED LIQUID CRYSTAL DISPLAY DEVICE AND THE CURVED LIQUID CRYSTAL DISPLAY DEVICE

FIELD

The present invention relates to liquid crystal display technology, more particularly to a front frame of a curved liquid crystal display device and the corresponding curved liquid crystal display device.

BACKGROUND

With the progress of optoelectronic and semiconductor technology, there has also been great development on flat panel display devices. Among various flat displays, due to various superior properties including high space utility, low power consumption, no radiation, and low electromagnetic interference, liquid crystal display (LCD) has become the mainstream of the market.

Generally, a liquid crystal display device includes a liquid crystal panel and a backlight module (BL). Since the liquid crystal panel itself does not emit light, the backlight module must be placed under the liquid crystal display panel to provide surface light source necessary for the liquid crystal display panel. Thus, the liquid crystal display panel can display image with the surface light source provided by the backlight module.

In recent years, curved liquid crystal display devices have been continuously produced by many companies. Generally, curved LCD devices provide superior viewing effect from an edge to another edge. However, typical flat LCD devices have inferior displaying effect at the screen edge. Entire screen of the curved LCDs has curve shape enclosing towards observers, which in turn provides wide full image effect. No matter on the screen center or at the edges, curved LCDs can bring the same visual enjoyment. When users observe from near distance, off-axis viewing distortion can be decreased. In addition, curved LCDs can lengthen the viewing distance for observers, achieving better viewing experience. For most of current curved LCD devices, edge-type curved backlight modules are used for provide light source to the curved LCD panels.

FIG. 1 is a diagram showing a conventional curved liquid crystal display device. As shown in FIG. 1, the curved liquid crystal display device includes a backlight module 1, a sealant 2 disposed on the backlight module 1, a liquid crystal display panel 3 disposed on the sealant 2, and a front frame 4 disposed on the liquid crystal display panel 3. The backlight module 1 includes a back board 11, a curved light guide plate 12 disposed in the back board 11, a backlight source 13 disposed in the back board 11, and a heat dissipation plate 14 used for installing the backlight source 13. A reflection plate 15 is further disposed between the back board 11 and the curved light guide plate 12. An optical film set 16 is further disposed on the curved light guide plate 12. Moreover, the reflection plate 15 and the optical film set 16 have the same curve shape as the curved light guide plate 12 has.

The front frame 4 includes a front board 41 and the side board 42 connected to the front board 41. The front board 41 is in curve shape, and the side board 42 is in vertical shape. The front board 41 and the side board 42 are connected with an acute angle. Generally, the front frame 4 is obtained by punching a metal material. FIG. 2 is a diagram showing punching for the conventional front frame. The mold for shaping mainly includes an upper mold plate 43 having an upper coping surface 43a, a lower mold plate 44 having a lower coping surface 44a, and a bending slide 45. During punching, front board 41 with curve shape is placed between the upper coping surface 43a and the lower coping surface 44a and shaped. Since the front board 41 and the sideboard 42 are closely connected, the sideboard 42 is directly bended along Y direction by means of the bending slide 45. Since the transition region 4a between the front board 41 and the side board 42 is exactly at the bending location, and the front board 41 and the side board 42 is connected in a non-right angle, it is difficult to control the bending accuracy and to limit the rebounding amount of the sheet metal during bending. Thus, the curve shape of the front board 41 of the front frame is not easy to control. The shape dimension of the front board 41 is not stable, affecting the quality of the display module.

SUMMARY

In view of this, the present invention provides a front frame of a curved liquid crystal display device. The liquid crystal display device includes a curved liquid crystal panel and a backlight module. The front frame is used for connecting the curved liquid crystal panel and the backlight module. The front frame includes a side board and a front board, wherein the side board is vertically shaped and is connected to the backlight module, wherein the front board includes a flat part and a curved part. The flat part is perpendicularly connected to the side board at one end and is connected to the curved part at another end. The curved part is pressed on and is fixed to the curved liquid crystal panel.

The curved part and the curved liquid crystal panel have the same curve shape.

A container is disposed under the flat part.

The front frame is made of aluminum alloy.

The front frame is formed by punching process.

According to another aspect of the invention, a curved liquid crystal display device is provided. The curved liquid crystal display device includes: a backlight module; a sealant disposed on the backlight module; a curved liquid crystal panel disposed on the sealant; and a front frame connected to the curved liquid crystal panel and the backlight module. The front frame applies the above-mentioned front frame.

The backlight module includes a back board; a curved light guide plate disposed in the back board; a light source disposed in the back board; and a heat dissipation board for installing the light source. The light source is disposed on a side surface of the curved light guide plate.

The backlight module further includes a reflection plate disposed between the back board and the curved light guide plate, wherein the reflection plate and the curved light guide plate have the same curve shape.

The backlight module further includes an optical film set disposed on the curved light guide plate, wherein at least part of the optical film set is disposed on the sealant, wherein the optical film set and the curved light guide plate have the same curve shape.

The light source is LED light.

Advantages:

In the curved liquid crystal display devices according to embodiments of the present invention, the front board of the front frame includes the flat part and the curved part. The flat part is used as the transition region between the curved part and the side board. Thus, the rebounding amount during shaping of the front frame can be decreased. The flat part is perpendicular to the side board of the front frame and is disposed between the side board of the front frame and the curved part. The curved part is completely shaped by punching in the punching mold. Therefore, the accuracy of the curve shape is not affected by the bending accuracy of the side board of the front frame. Thus, the shape accuracy can be greatly increased and the shaping can be more convenient. The flat part is perpendicularly connected to the side board of the front frame. Thus, compared to the conventional front frame, it is easier to control the bending of the front frame of the embodiments and easier to obtain dimension standard. Thus, by using the curved liquid crystal display device of the front frame structure, the assembly stability is higher, and the liquid crystal display module has better quality.

DETAILED DESCRIPTION OF THE INVENTION

The technology in the embodiments of the present invention will be described in detail by incorporating the appended figures and embodiments. It should be noted that the embodiments described are only some embodiments of the present invention, but not all embodiments. Based on the embodiments of the present invention, all other embodiments can be obtained by those skilled in the art without inventive endeavor, which are within the scope of the present invention.

Figure 1:
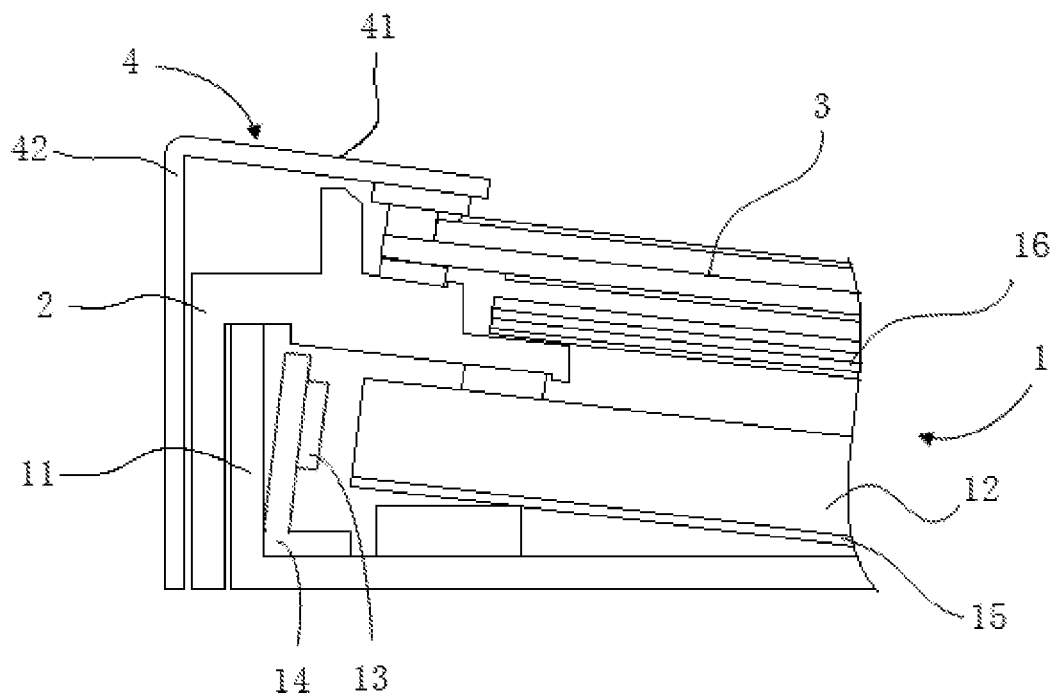
FIG. 1 is a diagram showing a conventional curved liquid crystal display device.
Figure 2:
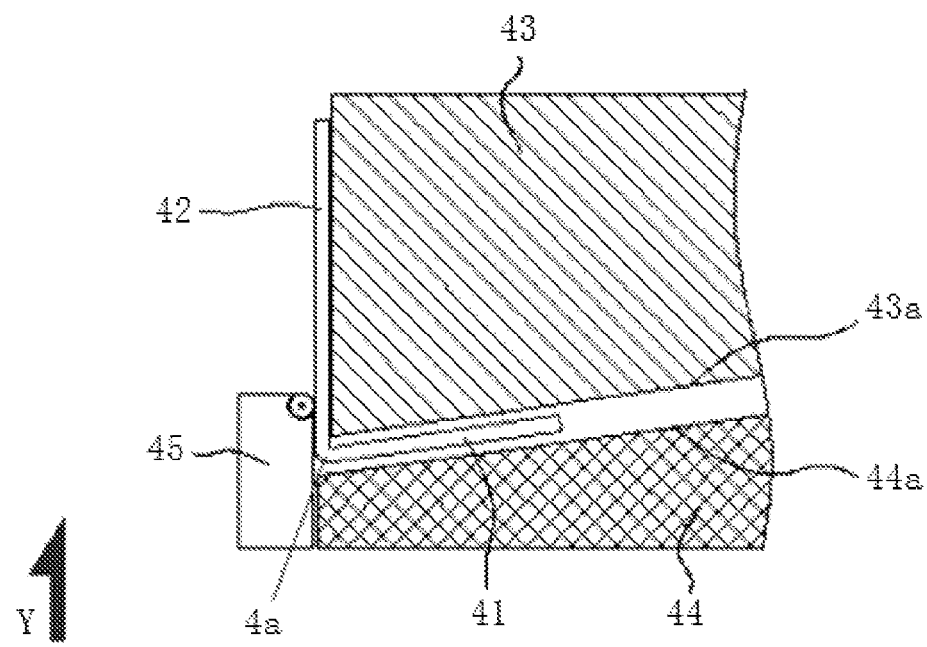
FIG. 2 is a diagram showing punching for a conventional front frame.
Figure 3:
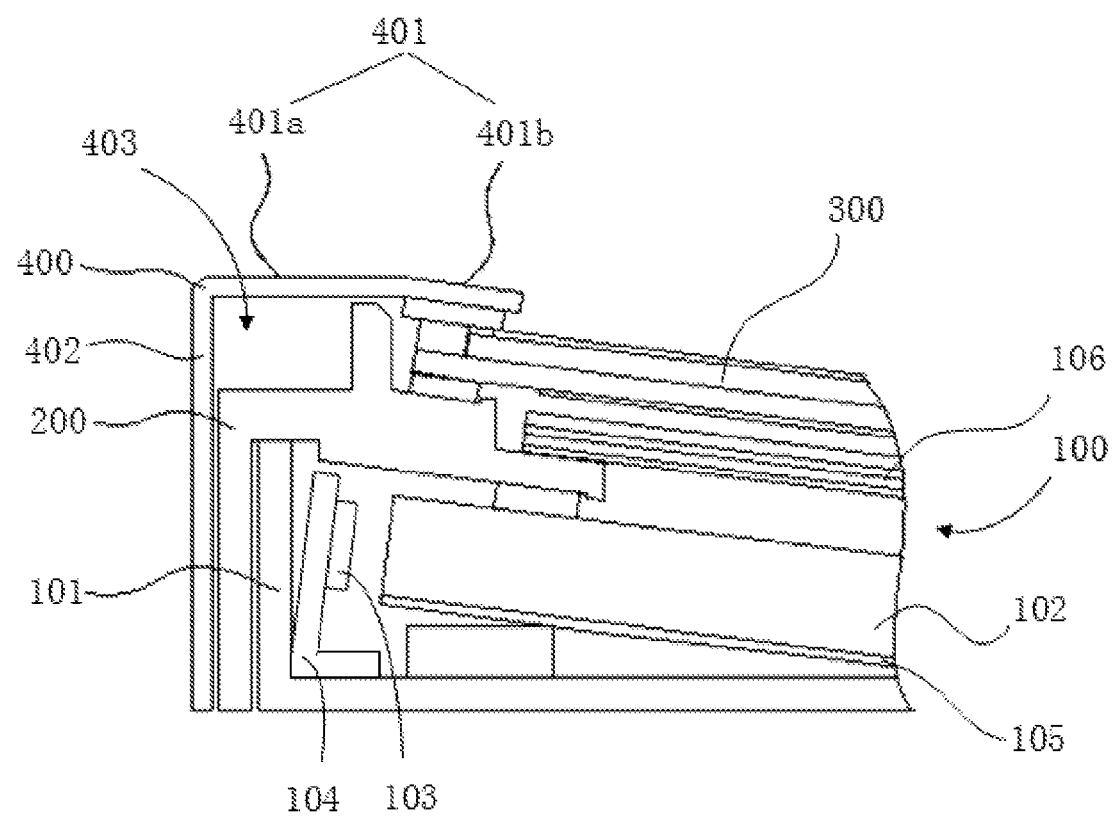
FIG. 3 is a diagram showing a curved liquid crystal display device according to an embodiment of the present invention.

FIG. 3 is a diagram showing a curved liquid crystal display device according to an embodiment. As shown in FIG. 3, the curved liquid crystal display device includes a backlight module 100; a sealant 200 disposed on the backlight module 100; a curved liquid crystal panel 300 disposed on the sealant 200; and a front frame 400 connected to the curved liquid crystal panel 300 and the backlight module 100. The liquid crystal panel 300 is disposed opposite to the backlight module 100. The backlight module 100 provides light source to the liquid crystal panel 300, thus, the liquid crystal panel 300 can display image.

Specifically, the backlight module 100 includes a back board 101; a curved light guide plate 102 disposed in the back board 101; a light source 103 disposed in the back board 101; and a heat dissipation board 104 for installing the light source 103. The light source 103 is disposed on a side surface of the curved light guide plate 102.

Moreover, the backlight module 100 further includes a reflection plate 105 and an optical film set 106. The reflection plate 105 is disposed between the back board 101 and the curved light guide plate 102. The optical film set 106 is disposed on the curved light guide plate 102, and at least part of the optical film set 106 is disposed on the sealant 200. The reflection plate 105 and the curved light guide plate 102 have the same curve shape. The optical film set 106 and the curved light guide plate 102 have the same curve shape.

Figure 4:
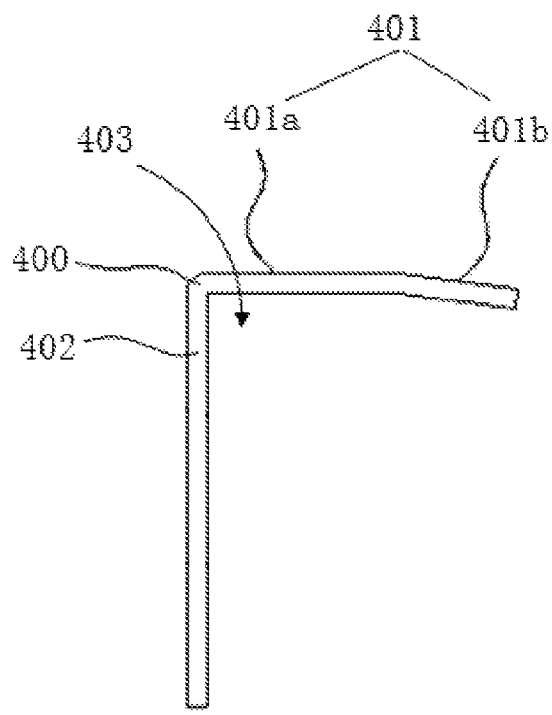
FIG. 4 is a diagram showing a front frame provided by an embodiment of the present invention.

Referring to FIG. 3 and FIG. 4, the font frame 400 includes a side board 402 and a front board 401. The side board 402 is vertically shaped and is connected to the backlight module 100. The front board 401 includes a flat part 401a and a curved part 401b. The flat part 401a is perpendicularly connected to the side board 402 at one end and is connected to the curved part 401b at another end. The curved part 401b is pressed on and is fixed to the curved liquid crystal panel 300.

Moreover, a container 403 is disposed under the flat part 401a. The container 403 has a space for accommodating the back board 101 and the side of the sealant 200, thus increasing the assembly stability of the liquid crystal module.

Generally, the front frame 400 is obtained by punching a metal material (for example, aluminum alloy can be chosen).

Figure 5:
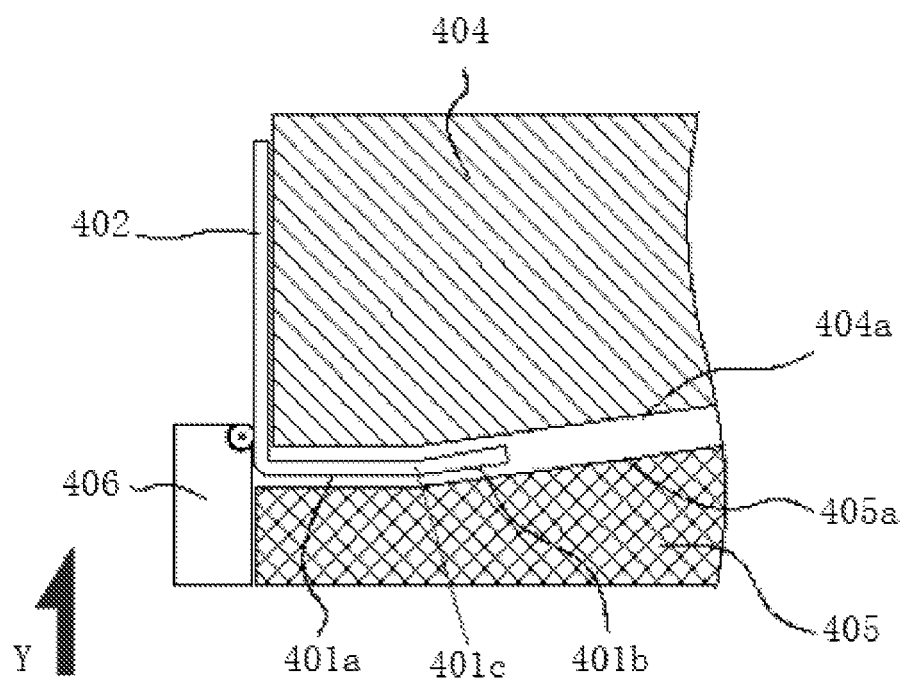
FIG. 5 is a diagram showing punching for a front frame according to an embodiment of the present invention.

FIG. 5 is a diagram showing punching for the front frame 400 as mentioned above. The mold for shaping mainly includes an upper mold plate 404 having an upper coping surface 404a, a lower mold plate 405 having a lower coping surface 405a, and a bending slide 406. During punching, the front board 401 is shaped by punching between the upper coping surface 404a and the lower coping surface 405a. The side board 402 is directly shaped by bending along Y direction by means of the bending slide 406.

With regard to the front frame 400, the front board 401 of the front frame 400 includes the flat part 401a and the curved part 401b. The flat part 401a is used as the transition region between the curved part 401b and the side board 402. Thus, the rebounding amount during shaping of the front frame 400 can be decreased. The flat part 401a is perpendicular to the side board 402 and is disposed between the side board 402 and the curved part 401a. The curved part 401a is completely shaped by punching in the punching mold (The curved deformation point 401c of the front board 401 is located in the punching mold, and is shaped by punching by means of the upper coping surface 404a and the lower coping surface 405a). Therefore, the accuracy of the curve shape is not affected by the bending accuracy of the side board 402 of the front frame. Thus, the shape accuracy can be greatly increased and the shaping can be more convenient. The flat part 401a is perpendicularly connected to the side board 402 of the front frame. Thus, compared to the conventional front frame, it is easier to control the bending of the front frame of the embodiments and the dimension standard is easier to obtain. Thus, the curved liquid crystal display device using such front frame structure, the assembly stability is higher, and the liquid crystal display module has better quality.

Preferably, the curved part 401b is used to press and fix the curved display panel 300 to the sealant 200. Therefore, for higher assembly stability, the curved part 401b can be designed to have the same curve shape as the curved liquid crystal panel 300 has (the same curvature radius).

Preferably, the light source 103 is LED light.

It should be explained that in the specification, the terms such as the first and the second are only used to distinguish one object or procedure from the other object or procedure. Such terms does not mean or imply any actual relation or sequence between these objects or procedures. In addition, terms "including", "having" or any other variations mean non-exclusive including. Thus, the process, method, object, or apparatus which includes a series of elements not only includes such elements, but also includes other elements not definitely listed or includes conventional elements that such process, method, object, or apparatus has. In the situation without any further limitations, the phrase "including a . . .

" defined element does not exclude any other same elements to be embraced in the process, method, object or apparatus including the defined element.

Obviously, the scope of the present invention is not limited by the above-mentioned embodiments. Those skilled in the art can carry out various modifications and changes without departing from the spirit and scope of the present invention. Thus, if these modifications and changes of the present invention are within the scope of the appended claims and the equivalent technology, the present invention also intends to include such modifications and changes.

The invention claimed is:

1. A curved liquid crystal display device, wherein the curved liquid crystal display device includes:
    a backlight module;
    a sealant disposed on the backlight module;
    a curved liquid crystal panel disposed on the sealant; and
    a front frame connected to the curved liquid crystal panel and the backlight module, wherein the front frame includes a side board and a front board, wherein the side board is vertically shaped and is connected to the backlight module, wherein the front board includes a flat part and a curved part, wherein the flat part is perpendicularly connected to the side board at one end and is connected to the curved part at another end, and
    wherein the curved part is pressed on and is fixed to the curved liquid crystal panel;
    wherein a container is disposed under the flat part and has a space for accommodating a back board of the backlight module and a side of the sealant;
    wherein the space includes an air space formed between the flat part and the sealant; and
    wherein the curved part and the curved liquid crystal panel have the same curve shape, and the curved part does not overlap with the air space in a plan view.

2. The curved liquid crystal display device according to claim 1, wherein the front frame is made of aluminum alloy.

3. The curved liquid crystal display device according to claim 2, wherein the front frame is formed by punching process.

4. The curved liquid crystal display device according to claim 1,
    wherein the backlight module includes the back board; a curved light guide plate disposed in the back board; a light source disposed in the back board; and a heat dissipation board used for installing the light source, wherein the light source is disposed on a side surface of the curved light guide plate.

5. The curved liquid crystal display device according to claim 4, wherein the backlight module further includes a reflection plate disposed between the back board and the curved light guide plate, wherein the reflection plate and the curved light guide plate have the same curve shape.

6. The curved liquid crystal display device according to claim 4, wherein the backlight module further includes an optical film set disposed on the curved light guide plate, wherein at least part of the optical film set is disposed on the sealant, wherein the optical film set and the curved light guide plate have the same curve shape.

7. The curved liquid crystal display device according to claim 4, wherein the light source is LED light.

* * * * *